United States Patent
Pruden

(10) Patent No.: US 10,439,923 B1
(45) Date of Patent: Oct. 8, 2019

(54) DESERIALIZATION SERVICE

(71) Applicant: Amazon Technologies, Inc., Reno, NV (US)

(72) Inventor: Ryan M. Pruden, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 337 days.

(21) Appl. No.: 15/273,272

(22) Filed: Sep. 22, 2016

(51) Int. Cl.
 G06F 15/16 (2006.01)
 H04L 12/26 (2006.01)
 H04L 12/741 (2013.01)
 H04L 29/06 (2006.01)

(52) U.S. Cl.
 CPC ............ H04L 43/18 (2013.01); H04L 45/745 (2013.01); H04L 69/22 (2013.01)

(58) Field of Classification Search
 CPC ............................... G06F 9/546; H04L 63/123
 USPC .................................................. 709/200, 250
 See application file for complete search history.

(56) References Cited

U.S. PATENT DOCUMENTS

| | | | | |
|---|---|---|---|---|
| 8,266,384 | B1* | 9/2012 | Ebdon ................ | G06F 12/0877 711/125 |
| 9,367,645 | B1* | 6/2016 | Gazit ...................... | G06F 12/00 |
| 2004/0131014 | A1* | 7/2004 | Thompson, III ....... | H04H 60/06 370/230 |
| 2006/0200486 | A1* | 9/2006 | Castro ............... | G06F 17/30342 |
| 2006/0277458 | A9* | 12/2006 | Layman .................. | G06F 9/465 715/234 |
| 2008/0243675 | A1* | 10/2008 | Parsons .................. | G06Q 40/00 705/37 |
| 2010/0083277 | A1* | 4/2010 | Malladi ................... | G06F 9/541 719/313 |
| 2010/0268952 | A1* | 10/2010 | Chung .................. | H04L 9/3236 713/170 |
| 2010/0332529 | A1* | 12/2010 | Nayak ....................... | G06F 9/54 707/770 |
| 2012/0254133 | A1* | 10/2012 | Hen-Tov .......... | G06F 17/30312 707/693 |

(Continued)

Primary Examiner — Phuoc H Nguyen
(74) Attorney, Agent, or Firm — Hogan Lovells US LLP

(57) ABSTRACT

Approaches described relate to the management of messages in an electronic environment. In particular, various approaches provide for analyzing messages of different message types to efficiently process those messages in a service environment, such as a multi-tenant environment. The messages can include one or more message fields, allowing for a plurality of different message types. The messages can be analyzed to identify known message types, and processing of messages of the same type can be expedited, e.g., by more quickly deserializing that message using cached message offset information associated with that message type. For example, a message that includes message data and an identifier can be received. The identifier can be matched to an entry associated with the identifier and message offset information. The message offset information can be utilized to determine positions in the received message that are associated with message data and the message data can be obtained without having to build up a reference structure around the structure of the message. Thereafter, a deserialized message can be generated using the message data retrieved using the message offset information.

19 Claims, 6 Drawing Sheets

(56) References Cited

U.S. PATENT DOCUMENTS

| | | | |
|---|---|---|---|
| 2014/0068448 A1* | 3/2014 | Plost | G06F 9/451 |
| | | | 715/738 |
| 2016/0147748 A1* | 5/2016 | Florendo | G06F 17/303 |
| | | | 707/809 |
| 2018/0173613 A1* | 6/2018 | Teitel | G06F 11/3664 |

* cited by examiner

DESERIALIZATION SERVICE

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. End users can communicate with those resources, process data with those resources, among other such tasks via messages in various formats. It can be expensive, however, to initialize a service to read those messages. It can be even more expensive to determine and manage messages of different types, as well as variations to those messages of various types.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described relate to the management of messages in an electronic environment. In particular, various approaches provide for analyzing different types of messages to efficiently process those messages in a service environment, such as a multi-tenant environment. The messages can include one or more message fields, allowing for a plurality of different message types. The messages can be analyzed to identify known message types, and processing of messages of the same type can be expedited, e.g., by more quickly deserializing that message using cached message offset information associated with that message type. For example, a message that includes message data and an identifier can be received. The identifier can be matched to an entry associated with the identifier and message offset information. The message offset information can be utilized to determine positions in the received message that are associated with message data and the message data can be obtained without having to build up a reference structure around the structure of the message. Thereafter, a deserialized message can be generated using the message data retrieved using the message offset information.

Embodiments provide a variety of advantages and are applicable in a number of situations. For example, in accordance with various embodiments, such approaches can be utilized by any resource that provides and/or receives messages. In another such application, approaches can be utilized for calls between services. In accordance with various embodiments, by providing better message processing, the system can more efficiently and quickly process messages. Accordingly, fewer interactions are necessary for processing messages. As such, fewer resources of the system are necessary to execute deserializing and other such processes. Various other such functions can be used as well within the scope of the various embodiments as would be apparent to one of ordinary skill in the art in light of the teachings and suggestions contained herein.

Figure 1:
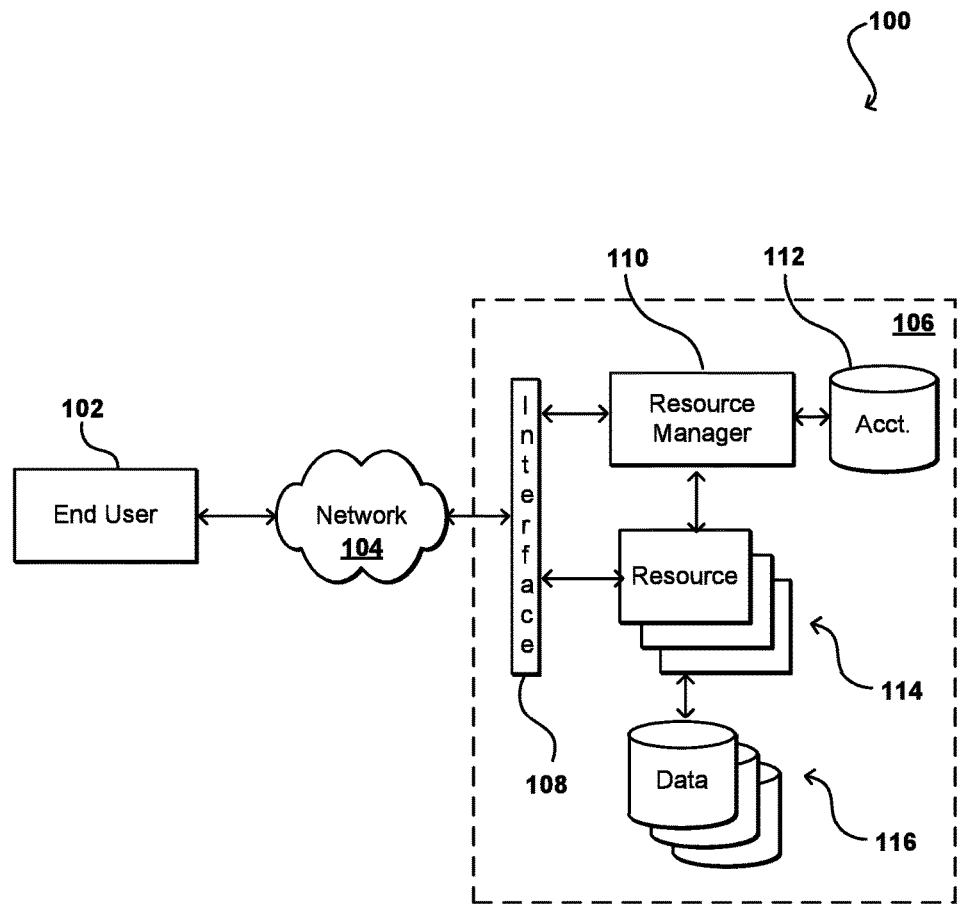
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like.

In accordance with various embodiments, a message can include one or more message fields. Each message field can include message data. A message type can be based on the message fields included in a message and an order of those message fields in the message. In an embodiment, messages of the same type include the same message fields in the same order. In various embodiments, messages of the same type can be indicated by an identifier included in the message or provided along with the message, where messages of the same type include matching identifiers. As described herein, such an indicator is not necessary to determine messages of the same type. In various embodiments, messages can be analyzed to identity the message fields and the order of the message fields in the message, where messages that include the same message fields in the same order can be of the same message type. An example message includes a java object notation (JSON) message. JSON is an open-standard format that uses human-readable text to transmit data objects consisting of attribute-value pairs. For purposes of illustration only, semi-structured data is represented in JSON format. Other self-describing, semi-structured formats can be used according to the principles of the present disclosure. Source data does not need to be self-describing. The description can be separated from the data, as would be the case with something like protocol buffers. As long as there are rules, heuristics, or wrapper functions to apply tags to the data, any input data can be turned into objects similar to a JSON format.

In accordance with various embodiments, a name-value pair, key-value pair, field-value pair or attribute-value pair is a fundamental data representation in computing systems and applications. In such situations, all or part of the data model may be expressed as a collection of tuples <attribute name, value>; each element is an attribute-value pair. Depending on the particular application and the implementation chosen by programmers, attribute names may or may not be unique. In the example of a JSON message, JSON syntax specifies that message data is in name/value pairs, where message data is separated by commas, curly braces hold objects, and square brackets hold arrays. A name/value pair consists of a field name (in double quotes), followed by a colon, followed by a value. JSON values can be a number (integer or floating point), a string (in double quotes), a Boolean (true or false), an array (in square brackets), an object (in curly braces), null. JSON objects are written inside curly braces. Just like JavaScript, JSON objects can contain multiple name/values pairs. JSON is the format that's very dynamic and self-descriptive so each field is mapped to a value and it's very explicit as far as what those fields and values are. And the ordering is non-determinant.

As described, other self-describing, semi-structured formats can be used according to the principles of the present disclosure. Such examples include a protobuf message, a messagpack message, or a concise binary object representation (CBOR) message, among others. At least one other example includes Amazon Ion, a richly-typed, self-describing, hierarchical data serialization format offering interchangeable binary and text representations. The text format (a superset of JSON) is easy to read and author, supporting rapid prototyping. Applications can consume Ion data in either its text or binary forms without loss of data fidelity. Ion's type system is a superset of JSON's: in addition to strings, Booleans, arrays (lists), objects (structs), and nulls, Ion adds support for arbitrary-precision timestamps, embedded binary values (blobs and clobs), and symbolic expressions. Ion also expands JSON's number specification by defining distinct types for arbitrary-size integers, IEEE-754 binary floating point numbers, and infinite-precision decimals. In binary Ion, common text tokens such as struct field names are automatically stored in a symbol table. This allows these tokens to be efficiently encoded as table offsets instead of repeated copies of the same text. As a further space optimization, symbol tables can be pre-shared between producer and consumer so that only the table name and version are included in the payload, eliminating the overhead involved with repeatedly defining the same symbols across multiple pieces of Ion data. A symbol table can include one or more symbols. Symbols are much like strings, in that they are Unicode character sequences. The primary difference is the intended semantics: symbols represent semantic identifiers as opposed to textual literal values. In the text format, symbols can be delimited by single-quotes and use the same escape characters. A subset of symbols are called identifiers and can be denoted in text without single-quotes. An identifier can be a sequence of ASCII letters, digits, or the characters $ (dollar sign) or (underscore), not starting with a digit.

The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an certificate authority, a key management service, a corporate entity, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the certificate authority could be a service offered from within the resource provider environment, among other such options.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a customer of such a multi-tenant environment might send a number of messages of different message types. The messages can include message fields, e.g., keys, that include respective message data, e.g., values, a symbol table that describes the message fields included in the message, and an identifier that can be used to identifier messages of the same message type. Using conventional approaches, it can be expensive in terms of time and processing power to analyze each message to extract relevant information from the message. For example, in a conventional approach, when a message is received, the message is analyzed to identify the keys and associated values for those key in the message. This process is repeated for each message received. Accordingly, approaches presented herein provide a framework that identifies successive message of the same type, determines a protocol for those messages, and uses information about the protocol to deserialize messages of the same type without building up a reference structure around the structure of the message.

In one example, a message identifier is not present in the message. In this example, when the message is received, the protocol for that message type can be determined, and the protocol can be used to deserialize successive messages of that type. For example, the message can be received and the message can be analyzed to determine the location of the message fields included in the message, and what those message fields are. The message field data associated with those message fields can be recorded in a table and message offset information can be cached. The message offset information can be used to determine a position in the table and/or message that includes the message field data for a particular message. When a subsequent message of the same type is received, the message offset information is used to read the message field data from the subsequent message, and the message field data can be used to deserialize the subsequent message. Accordingly, the subsequent message does not have to be parsed to identify the message fields and the associated message field data for those message fields. Instead, because the message offset information has already been determined for messages of the same type, the message offset information can be used to extract the appropriate information from the subsequent message.

In another example, a message identifier is present in the message. In this example, when the message is received, the identifier can be used to obtain (if available) or determine (if not available) message offset information. As described, message offset information can be utilized to determine positions in the received message that are associated with message data and the message data can be obtained without having to build up a reference structure around the structure of the message. The identifier can be any appropriate identifier. An example identifier can be a hash value. The identifier and/or message offset information can be determined by any number of resources in the environment. This can include, e.g., client devices, a message service, etc. When the message is received, the identifier associated with the message can be compared to list of identifiers. In the situation where the identifier is not included in the list of identifiers, an entry that includes the identifier, the message field data associated with those message fields, and message offset information can be recorded in one or more tables. When a subsequent message is received that includes the same identifier, the message offset information associated with the stored identifier can be used to read the message field data from the subsequent message and/or a table that includes the message data of the subsequent message without having to parse the subsequent message to identify the message fields to extract the associated message field data.

Figure 2:
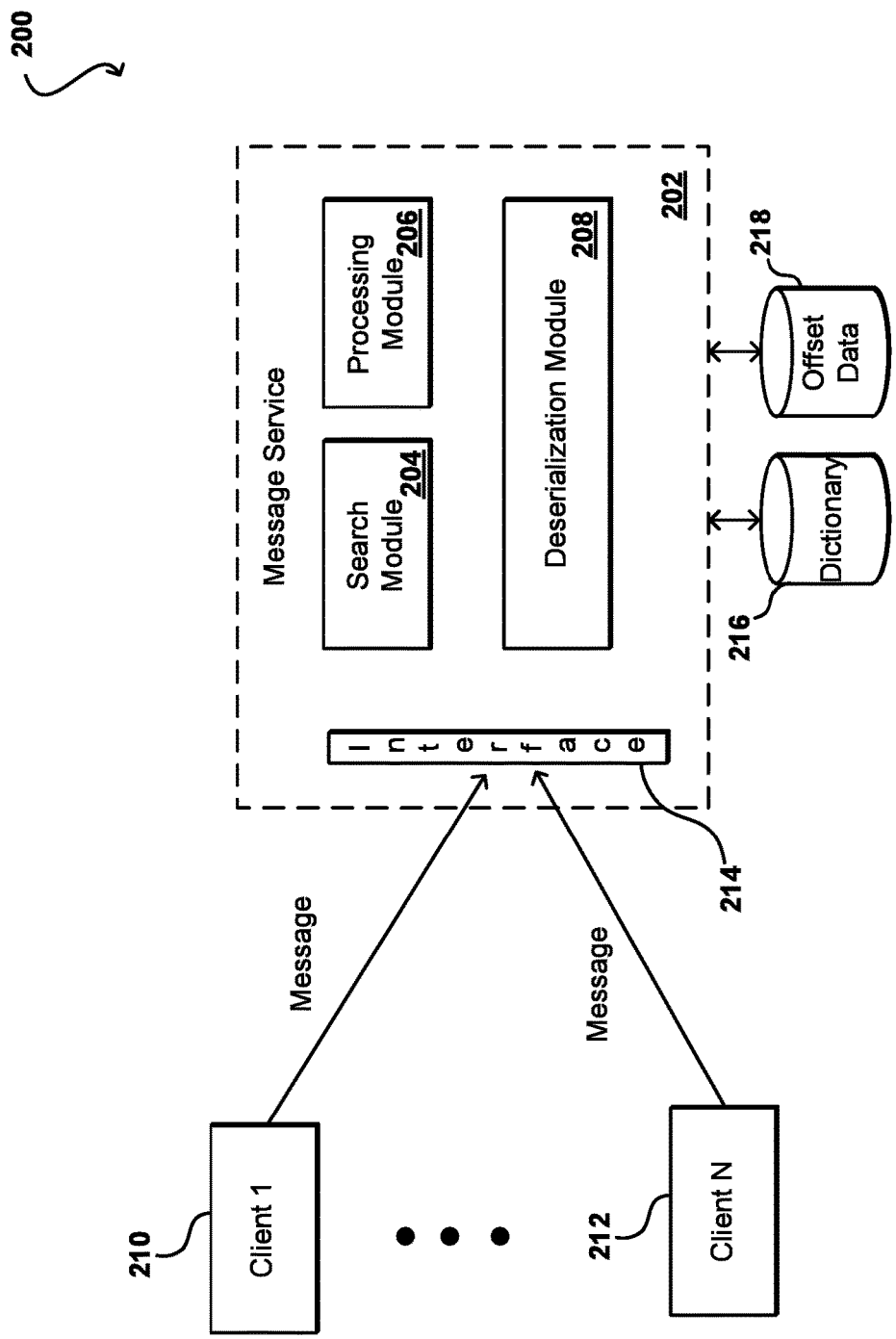
FIG. 2 illustrates an example subsystem for deserializing messages that can be utilized in accordance with various embodiments.

FIG. 2 illustrates an example framework implementation 200 that can be utilized in accordance with various embodiments. In this example, a message service 202 includes a search module 204, a processing module 206, and a deserialization module 208, although additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

In this example, the message service can communicate with a set of client devices 210, 212 located in a publicly-accessible (or at least customer-accessible) resource environment. The message service 202 can receive messages from the client devices and deserialize the received messages. In this example, a message can be digested by a client device, and the client device can generate an identifier based on the message fields (e.g., keys) in the message, the message field type (e.g., key type of the keys), and the message fields' (e.g., keys') position in the message. In certain embodiments, message offset information can be determined at the time the identifier is generated. In other embodiments, the message offset information can be determined at the message service 202, as will be described herein. Message offset information can be used to read message field data (e.g., values) from the message at specific locations in the message In accordance with various embodiments, the client devices may operate an identifier service or at least be in communication with a service that can generate an identifier for each message. As described, the identifier can be used to identifier messages of the same message type. The identifier can be any appropriate identifier. An example identifier is a hash value. A hash value is a numeric value of a fixed length that uniquely identifies data. A hash function can be used to generate the hash value. As will be described further herein, the hash values can be used in a hash table or database to lookup message offset information (e.g., byte offset values) for messages of the same type (i.e., messages associated with the same hash value.) A hash table (hash map), generally speaking, includes a data structure used to implement an associative array, a structure that can map keys to values. A hash table may use a hash function to compute an index into an array of buckets or slots, from which the desired value can be found.

The message, identifier, and message offset information can be provided to the message service 202. For example, the message can be received at a network interface layer 214 of the message service. The network interface layer can include any appropriate components known or used to receive requests from across a network, such as may include one or more application programming interfaces (APIs) or other such interfaces for receiving such requests. The network interface layer 214 might be owned and operated by the provider, or leveraged by the provider as part of a shared resource or "cloud" offering. The network interface layer can receive and analyze the messages, and cause at least a portion of the information in the message to be directed to an appropriate system or service, such as search module 204 or processing module 206. For example, the interface can provide the message, message identifier (if available), and message offset information (if available) to search module 204.

In the situation where an identifier is available, search module 204 is operable to search a table of identifiers to determine whether there is a matching identifier to the received identifier. In the situation where there is not matching identifier, the search module can generate an entry in a table of identifiers in data store 216. The entry can include the identifier, message fields (e.g., keys), and associated message field data (e.g., key values.) In the situation where message offset information is not provided, message offset information can be determined and stored in offset data store 218. When a subsequent message is received that includes the same identifier, the search module can retrieve the message offset information associated with the identifier. Deserialization module 208 can use the message offset information to locate and read specific message portions of the message, and use the information to deserialize the message. In accordance with various embodiments, deserializing a message includes obtaining message data from a table, a file, an incoming network socket, etc. and reconstructing an object model using the message data. Serialization is the process of turning an object into a series of bytes for transferring or storing. Accordingly, the deserialization module obtains message data e.g., bytes, corresponding to message, and generates an object using the message data.

In certain embodiments, messages may not include an identifier. In such situations, processing module 206 is operable to determine where the message fields (e.g., keys) and associated message field data (e.g., values) are positioned in the message, and what those keys are and how they related to the overall system. In this approach, information associated with the keys and their associated values can be recorded in a table. For example, bytes corresponding to the information can be copied from the message into, for example, a string table, where the information can be cached according to a set of caching rules. In accordance with an embodiment, the set of caching rules can be used to clean up the table. For example, a number of entries in the table can be based at least in part on one of a frequency of receiving a particular identifier, an amount of memory to maintain the table, an amount of processing power to maintain the table, a number of entries in the table, an amount of time to search for an entry in the table, an importance indicator associated with entries in the table, among other such criteria. In one example, cleaning up the table can include determining an amount of memory to maintain the table, determining an amount of processing power to maintain the table, and removing entries in the table based at least in part on the amount of memory and the amount of processing power. It should be noted that various approaches can be implemented to clean up the table and the example provided is one such example.

Identifying the keys can include parsing the message for keys and determining byte and/or message offsets information to read those keys in the message or as copied in string table. The keys can be copied into strings and recorded in the string table and the message offsets can be stored in offset data store 218. It should be noted that data store 216 and 218 can be the same data store or as shown different data stores. When a subsequent message of the same type is received, message offsets of that type of message can be used to determine the location of the key in the message, and the value associated with the key can be read. The message does not have to be analyzed to determine message offsets to determine where to read the keys in the message. Instead, the message offsets have already been determined and can be used to extract the appropriate information. As described, an identifier can be used to determine messages of the same type. Messages of the same type can include messages with the same keys where the keys are in the same order. In the situation where an identifier indicating such information is not available, the message can be analyzed to determine the keys in the message and the order of the keys in the message.

In accordance with various embodiments, the message service may be performed by any number of server computing devices, desktop computing devices, mainframe computers, and the like. Each individual device may implement one of the modules of the message service. In some embodiments, the message service can include several devices physically or logically grouped together to implement one of the modules or components of the message service. For example, message service 202 can include various modules and components combined on a single device, multiple instances of a single module or component, etc. In one specific, non-limiting embodiment, search module 204 and processing module 206 can execute on one device and deserialization module 208 can execute on another device. In another embodiment, the message service can execute on the same device.

In some embodiments, the features and services provided by the message service may be implemented as web services consumable via a communication network. In further embodiments, the message service is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figures 3, 4:
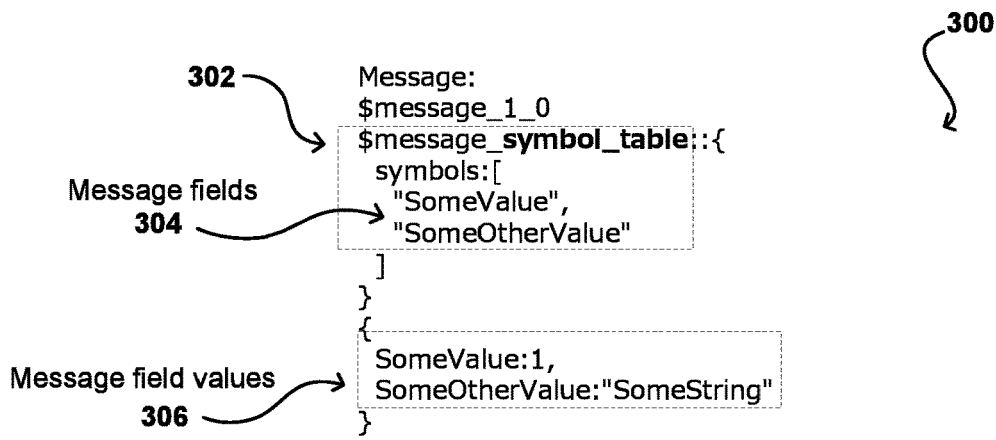
FIG. 3 illustrates an example message in accordance with various embodiments.
FIG. 4 illustrates an example message that can be utilized in accordance with various embodiments.

FIG. 3 and FIG. 4 illustrate example message schemas that can be utilized in accordance with various embodiments. As mentioned, a customer of a multi-tenant environment might send messages of different message types. The messages can include message fields, e.g., keys that include respective message data, e.g., values, a symbol table that describes the message fields included in the message, and an identifier that can be used to identify messages of the same message type. As shown in example 300 of FIG. 3, the message includes a symbol table 302. The symbol table 302 includes message fields (e.g., symbols, keys, etc.) 304. As shown, the message fields 304 for the message include "SomeValue" and "SomeOtherValue." The respective message field values 306 for the message fields include "1" and "SomeString," respectively.

Using conventional approaches, it can be expensive in terms of time and processing power to analyze each message to extract relevant information from the message to deserialize that message. For example, in a conventional approach, when a message is received, the message is analyzed to identify the message fields and associated message data. This process is repeated for each message received. Accordingly, approaches presented herein provide a framework that identifies successive messages of the same type, determines a protocol for those messages, and uses information about the protocol to deserialize messages of the same type without building up a reference structure around the structure of the message. When a message is received of a different type, the protocol for that message type can be determined, and the protocol can be used to deserialize successive messages of that type.

For example, message 300 can be obtained. It should be noted that message 300 is depicted in an example message schema of an array. An array data structure, or array, is a data structure that includes a collection of elements (e.g., values and variables), each identified by at least one array index or key. An array is stored so that the position of each element can be computed from its index tuple by a mathematical formula. An example data structure is a linear array, also called one-dimensional array. Arrays may be used to implement tables, e.g., lookup tables, string tables, etc. An entry in a string table can be a string. A string is generally understood as a data type and is often implemented as an array of bytes (or words) that stores a sequence of elements, typically characters, using some character encoding. A string may also denote more general arrays or other sequence (or list) data types and structures.

In this example, elements of the message include message fields 304 and associated message field values 306. An entry in a string table can include the message fields and associated message field values, message field values, or a combination thereof. For example, bytes corresponding to the information can be copied from the message into, for example, a string table, where the information can be cached according to a set of rules. In accordance with various embodiments, any one of a number of data storage and retrieval approaches can implemented. In this example, the entry can include the message fields and associated message field values.

The entry can be analyzed to determine the position of each element in the entry. This can include determining the position of the message fields and respective message data 306 (e.g., message field data) associated with those message fields in the entry. As described, the entry can be an array of bytes. The position of the message fields and respective message data can be designated by message offset information. In accordance with various embodiments, message offset information within an array or other data structure object can be an integer indicating the distance (displacement) between the beginning of the array and a given element or point, presumably within the same array. In this way, the message offset information can be a value indicating the displacement between the beginning of the message to each message field of message fields 304 in the array. In an embodiment, data following a particular message offset can correspond to the message field value (e.g., SomeString) for a corresponding message field (e.g., SomeOtherValue). In another embodiment, data following a particular message offset can correspond a message field (e.g., SomeOther- Value), and data following the message field can correspond the message field data (e.g., SomeString) associated with the message field.

As described, messages of the same type are associated with the same message offset information. That is, messages of the same type include message fields and associated message field data recorded in an array in the same way. Thus, message offset information, which describes the position of the message fields and associated message field data in a message, can be used to quickly obtain message field data for messages of the same type without having to parse the message.

In certain embodiments, the message can include an identifier. As shown in example 400 of FIG. 4, the message includes identifier 402, message fields 424, and message field data 426. The identifier 402 can be used to indicate messages of the same type. As described, messages of the same type include message fields and associated message field data recorded in an array in the same way. Thus, message offset information, which describes the position of the message fields and associated message field data, can be used to quickly obtain message field data for messages of the same type. The identifier can be any appropriate identifier. An example identifier is a hash value. In this example, message fields 424 include "rst" and "lne." Message field "rst" is part of a shared symbol table, and includes message fields "SomeValue" and "SomeOtherValue." As described, with respect to FIG. 3, the message field values are "1" and "SomeString," respectively. Message field "lne" is associated with message field value "SomeString."

In accordance with an embodiment, to determine message offset information to quickly deserialize the message, identifier 402 associated with the message can be compared to list of identifiers. In the situation where identifier 402 is not included in the list of identifiers, the message can be analyzed to determine the message offset information in accordance with the various approaches described herein. In the situation where identifier 402 is included in the list of identifiers, message offset information associated with the identifier can be obtained and the message offset information can be used to read message fields 424 and associated message field data 426 message field data without having to parse the message.

Figure 5:
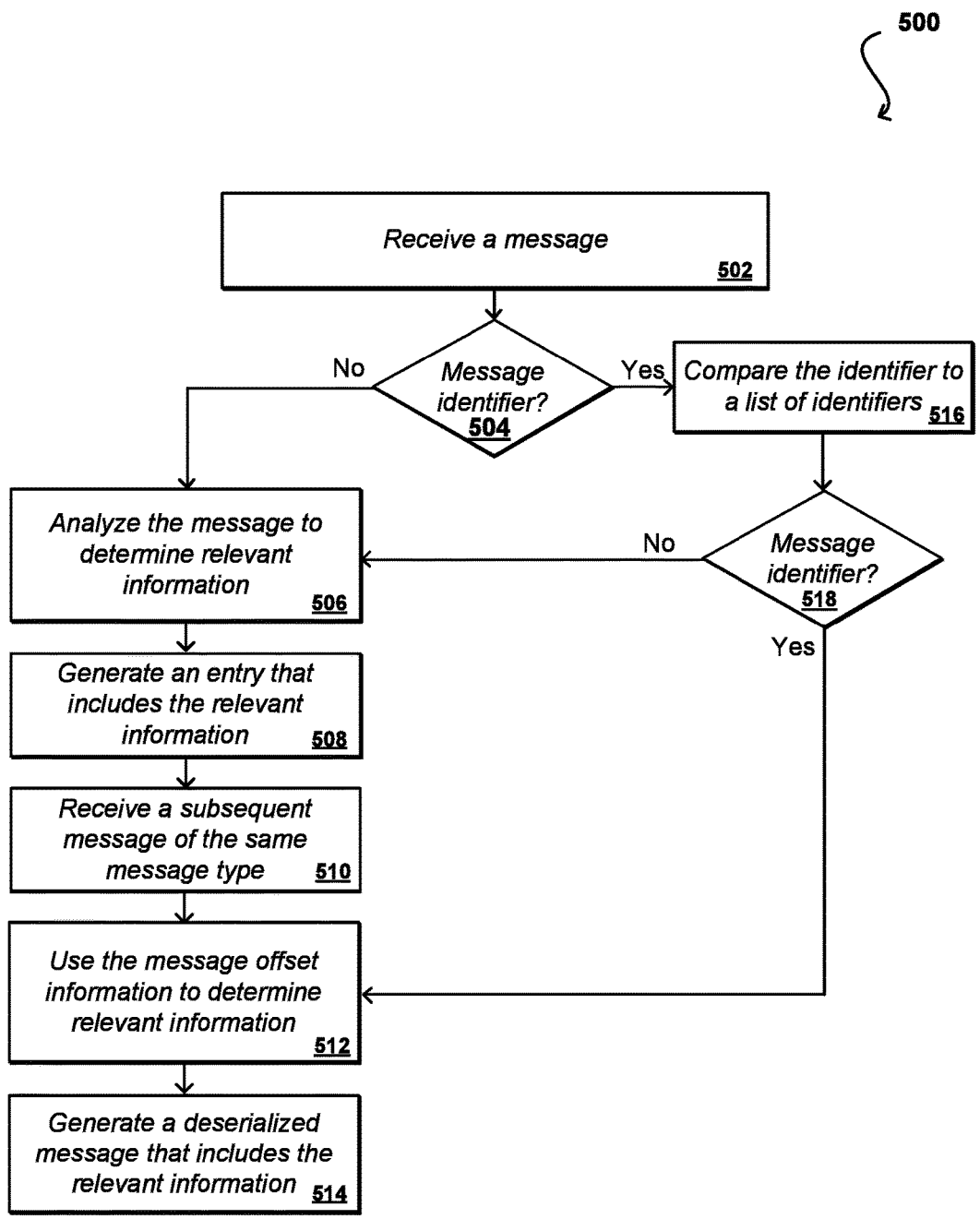
FIG. 5 illustrates an example process for deserializing messages that can be utilized in accordance with various embodiments.

FIG. 5 illustrates an example process 500 for deserializing messages that can be utilized in accordance with various embodiments. It should be understood that for this and other processes discussed herein that there can be additional, alternative, or fewer steps performed in similar or alternate orders, or at least partially in parallel, within the scope of the various embodiments unless otherwise specifically stated. In this example, a message is received 502. A message can include one or more message fields. Each message field can include message data and be associated with a message type. A message type can be based on the message fields included in a message and an order of those message fields in the message. In an embodiment, messages of the same type include the same message fields in the same order. In various embodiments, messages of the same type can be determined by an identifier included in the message, where messages of the same type include matching identifiers. As described herein, such an indicator is not necessary to determine messages of the same type. In various embodiments, messages can be analyzed to identity the message fields and the order of the message fields in the message, and messages that include the same message fields in the same order can be of the same message type. In this example, once the message is received, a determination is made 504 whether the message includes a message identifier. In the situation where the message does not include a message identifier, the message can be analyzed 506 to determine relevant information associated with message. This can include determining message fields and associated message field data and message offset information. The message offset information can be utilized to determine a position in a table and/or message that includes the message field data for messages of the same type. An entry in a table that includes the relevant information can be generated 508. When a subsequent message of the same type is received 510, the message offset information is used 512 to determine the message field data from the subsequent message and/or table. A deserialized message that includes the relevant information associated with the subsequent message is generated 514. The subsequent message does not have to be analyzed to identify the message fields and corresponding message field data for those message fields. Instead, because the message offset information has already been determined for messages of the same type, the message offset information can be used to extract the appropriate information from the subsequent message.

In the situation where the message includes a message identifier, the identifier can be used to retrieve message offset information to locate relevant information associated with the message which can be used when deserializing the message. For example, when the message is received, the identifier associated with the message can be compared 516 to list of identifiers. A determination 518 is made whether the identifier is included in a list of identifiers. In the situation where the identifier is not included in the list of identifiers, the message can be analyzed to determine the relevant information. In this case, the relevant information further includes the identifier. An entry that includes the relevant information (i.e., message fields and associated message field data, message offset information, and the identifier) can be generated in the table. Message offset information can be determined based on the location of the message fields in the message. When a subsequent message is received that includes the same identifier, and thus is of the same message type, the message offset information associated with the identifier can be used to read the message field data from the subsequent message without having to parse the subsequent message to identify the message fields to extract the associated message field data. Thereafter, a deserialized message that includes the relevant information associated with the subsequent message is generated. In the situation where the identifier is included in the list of identifiers, message offset information associated with the identifier can be obtained. The message offset information can be used to read the message field data from the message without having to parse the message to identify the message fields to extract the associated message field data. Thereafter, a deserialized message that includes the relevant information associated with the message is generated.

Figure 6:
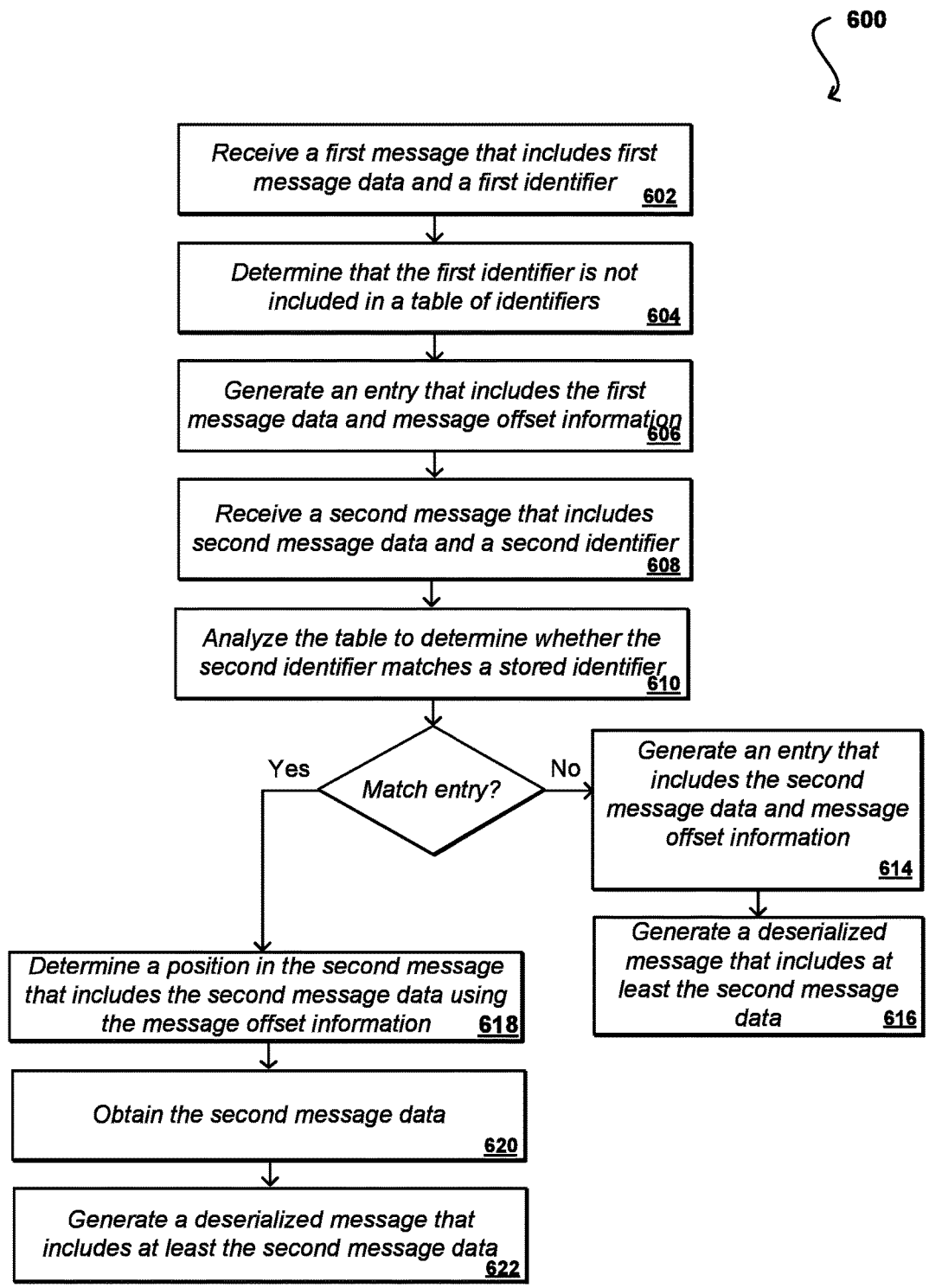
FIG. 6 illustrates another example process for deserializing messages that can be utilized in accordance with various embodiments.

FIG. 6 illustrates an example process 600 for deserializing messages that can be utilized in accordance with various embodiments. In this example, a first message is received 602, the first message including a first message field associated with first message data and a first hash value generated based at least in part on the first message field. It is determined 604 that the first hash value is not included in a table of hash values. For example, the first hash value can be compared to the table of hash values. In the situation where the hash value is not present, an entry can be generated 606 in the table of hash values that includes the first hash value and message offset information that identifies a position in the first message that includes the first message data. A second message can be received 608, the second message including a second message field associated with second associated value, and a second hash value. The table can be analyzed 610 to determine whether the second hash value matches the first hash value. In the situation where second hash value does not match the first hash value, an entry can be generated 614 in the table that includes the second message data and message offset information. Thereafter, a deserialized message that includes at least the second message data can be generated 616. In the situation where the second hash value matches the first hash value, a position in the second message that includes the second message data can be determined 618 using the message offset information. The second message data can be obtained 620 and a deserialized message that includes the second message data can be generated 622.

Figure 7:
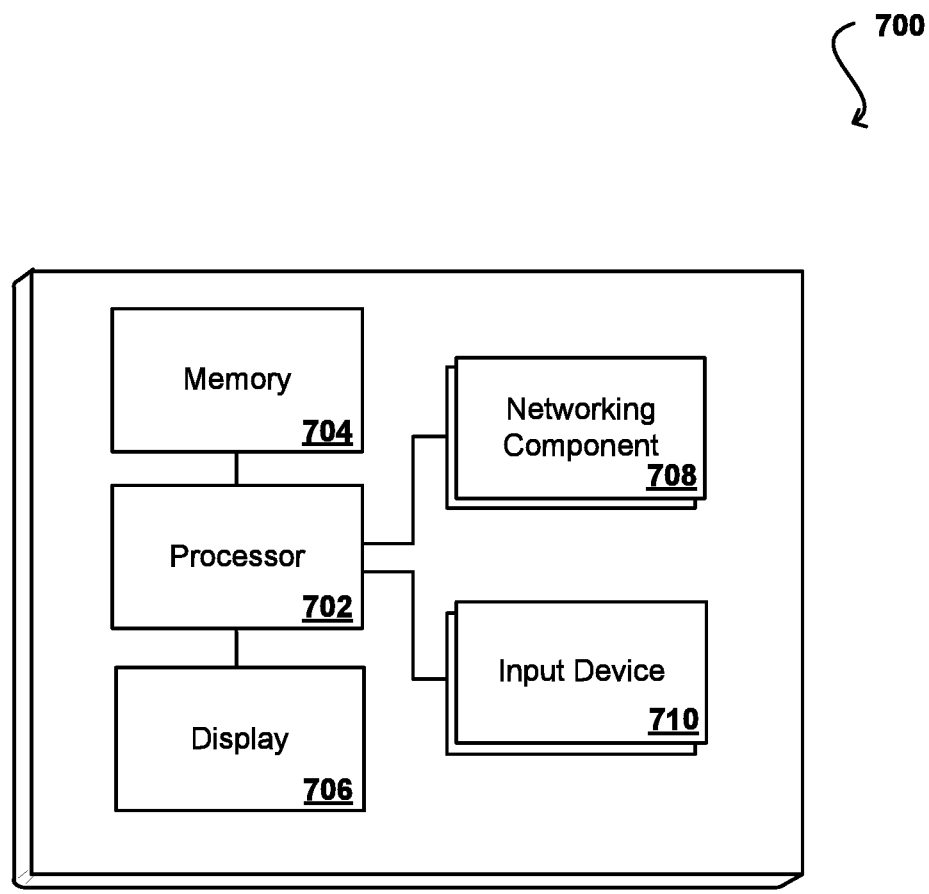
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:

at least one processor; and memory including instructions that, when executed by the at least one processor, cause the system to:

receive a first message, the first message including a first message field associated with first message data, and a first hash value generated based at least in part on the first message field;

determine that the first hash value is not included in a table of hash values;

analyze the first message to determine message offset information for the first message data in the first message;

generate an entry in the table of hash values that includes the first hash value and the message offset information that identifies a position in the first message associated with the first message data;

receive a second message, the second message including a second hash value and a second message field associated with second message data;

analyze the table to determine that the second hash value matches the first hash value;

determine a position in the second message that includes the second message data using the message offset information;

obtain the second message data; and generate a deserialized message that includes the second message data.

2. The system of claim 1, wherein the instructions when executed further cause the system to:

receive a third message at a client device in a provider environment, the third message including a plurality message fields in an ordered arrangement;

use a hashing technique to generate a third hash value based at least in part on the plurality of message fields and the ordered arrangement of the plurality of message fields; and update the third message to include the third hash value.

3. The system of claim 1, wherein the instructions when executed further cause the system to:

receive a third message, the third message including a plurality of message fields in an ordered arrangement;

determine a message type associated with the third message based at least in part on the ordered arrangement of the plurality of message fields;

determine message offset information for the message type; and store the message offset information of the message type.

4. A system, comprising:

at least one processor; and memory including instructions that, when executed by the at least one processor, cause the system to:

receive a first message that includes first message data and a first identifier;

analyze the first message to determine message offset information for a position in the message that includes the first message data;

generate an entry in a table associating the first identifier to the message offset information;

receive a second message that includes second message data and a second identifier, match the second identifier to the entry in the table;

determine a position in the second message that includes the second message data using the message offset information; and generate a deserialized message based at least in part on the second message data and the message offset information.

5. The system of claim 4, wherein the message is a first message that includes first message data, and wherein the instructions when executed further cause the system to:

receive a second message that includes a second identifier and second message data;

determine that the second identifier is not included in the table; and generate an entry in the table that includes the second identifier and message offset information that identifies a position in the second message that includes the second message data.

6. The system of claim 4, wherein the first message data includes binary data, and wherein the instructions when executed further cause the system to write the binary data into a string table of the table.

7. The system of claim 6, wherein the instructions when executed to further cause the system to analyze the string table to determine the message offset information.

8. The system of claim 4, wherein the instructions when executed further cause the system to:

receive a third message at a client device in a provider environment, the third message including a first data field type and a second data field type;

generate a third identifier based at least in part on the first data field type and the second data field type; and update the third message to include the third identifier.

9. The system of claim 8, wherein the third identifier is further based at least in part on an ordered arrangement of the first data field type and the second data field type.

10. The system of claim 4, wherein the instructions when executed further cause the system to:

determine an amount of memory to maintain the table;

determine an amount of processing power to maintain the table; and remove entries in the table based at least in part on the amount of memory and the amount of processing power.

11. The system of claim 4, wherein a number of entries in the table is based at least in part on one of a frequency of receiving a particular identifier, an amount of memory to maintain the table, an amount of processing power to maintain the table, a number of entries in the table, an amount of time to search for an entry in the table, or an importance indicator associated with entries in the table.

12. The system of claim 4, wherein the first message is one of a JavaScript Object Notation (JSON) message format, an ION message format, a protobuf message format, a messagpack message format, or a concise binary object representation (CBOR) message format.

13. The system of claim 4, wherein the instructions when executed further cause the system to:

receive a third message that includes third message data, a first portion of the third message data associated with a first data field type and a second portion of the second message data associated with a second data field type;

determine an order of the first data field type and the second data field type in the third message; and match the order to a second entry in the table that includes second message offset information, the second message offset information used to determine a first position in the third message that includes the first portion of the second message data and a second position in the second message that includes the second portion of the third message data.

14. The system of claim 13, wherein the instructions when executed further cause the system to:
generate a second deserialized message based at least in part on the third message data and the second message offset information.

15. The system of claim 4, wherein the message includes a key-value pair and an ordered list of values, and wherein the key-value pair is realized as one of an object, a record, a struct, a dictionary, a hash table, a keyed list, or an associative array, and wherein the ordered list of values is realized as one of an array, a vector, a list, or a sequence.

16. A computer-implemented method, comprising:
receiving a first message that includes first message data and a first identifier;
analyzing the first message to determine message offset information for a position in the message that includes the first message data;
generating an entry in a table associating the first identifier to the message offset information;
receiving a second message that includes second message data and a second identifier;
matching the second identifier to the entry in the table;
determining a position in the second message that includes the second message data using the message offset information; and
generating a deserialized message based at least in part on the second message data and the message offset information.

17. The computer-implemented method of claim 16 further comprising:
receiving a third message that includes third message data, a first portion of the third message data associated with a first data field type and a second portion of the third message data associated with a second data field type;
determining an order of the first data field type and the second data field type in the third message;
matching the order to a second entry in the table that includes third message offset information, the third message offset information used to determine a first position in the third message that includes the first portion of the third message data and a second position in the third message that includes the second portion of the third message data; and
generating a second deserialized message based at least in part on the third message data and the third message offset information.

18. The computer-implemented method of claim 16, further comprising:
determining an amount of memory to maintain the table;
determining an amount of processing power to maintain the table; and
removing entries in the table based at least in part on the amount of memory and the amount of processing power.

19. The computer-implemented method of claim 16, wherein the first message data includes binary data, the method further comprising:
writing the binary data into a string table of the table; and
analyzing the string table to determine the message offset information.

* * * * *